(12) United States Patent
Herzig

(10) Patent No.: US 8,877,859 B2
(45) Date of Patent: Nov. 4, 2014

(54) SILICONE ASPARTATE COPOLYMERS

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/994,562

(22) PCT Filed: Dec. 19, 2011

(86) PCT No.: PCT/EP2011/073241
§ 371 (c)(1),
(2), (4) Date: Jun. 14, 2013

(87) PCT Pub. No.: WO2012/084826
PCT Pub. Date: Jun. 28, 2012

(65) Prior Publication Data
US 2013/0267654 A1    Oct. 10, 2013

(30) Foreign Application Priority Data
Dec. 21, 2010    (DE) .................. 10 2010 063 737

(51) Int. Cl.
C08L 83/00    (2006.01)
B22F 1/00    (2006.01)
C08K 5/17    (2006.01)
C08G 77/388    (2006.01)
C08G 77/445    (2006.01)
C08G 77/26    (2006.01)

(52) U.S. Cl.
CPC .............. C08G 77/26 (2013.01); C08G 77/388 (2013.01); C08G 77/445 (2013.01)
USPC ................................ 524/588; 524/1; 524/255

(58) Field of Classification Search
CPC ........ C08L 83/04; C08G 77/20; C08G 77/16; C08G 77/12; C09D 183/04
USPC .............................................. 524/588, 1, 255
See application file for complete search history.

(56) References Cited

U.S. PATENT DOCUMENTS

| | | | |
|---|---|---|---|
| 4,814,392 A | | 3/1989 | Shea et al. |
| 5,990,334 A | * | 11/1999 | Hierstetter et al. ........... 556/413 |
| 6,664,342 B1 | | 12/2003 | Köhler et al. |
| 2006/0178470 A1 | * | 8/2006 | Majolo et al. ................. 524/588 |

FOREIGN PATENT DOCUMENTS

EP    0324595 A1    7/1989

* cited by examiner

Primary Examiner — Ling Choi
Assistant Examiner — Jessica E Whiteley
(74) Attorney, Agent, or Firm — Brooks Kushman P.C.

(57) ABSTRACT

Aspartate-containing silicone copolymers are prepared in high yield and with low reaction time by preparing a monoester of hydroxyl functional polyether by reaction of the latter with maleic anhydride, and then reacting with a silicone containing at least one primary or secondary amino group.

10 Claims, No Drawings

SILICONE ASPARTATE COPOLYMERS

CROSS-REFERENCE TO RELATED APPLICATIONS

This application is the U.S. National Phase of PCT Appln. No. PCT/EP2011/073241 filed Dec. 19, 2011 which claims priority to German Application No. 10 2010 063 737.8 filed Dec. 21, 2010, the disclosures of which are incorporated in their entirety by reference herein.

BACKGROUND OF THE INVENTION

1. Field of the Invention

The invention relates to silicone aspartate copolymers and to a process for their preparation.

2. Description of the Related Art

To bond silicones to organic polymers is a relatively difficult problem which places high requirements on reaction management. A customary method for silicone copolymer preparation is the preparation of silicone polyethers from unsaturated polyethers and hydrogen-siloxanes by means of hydrosilylation, but these can only be carried out satisfactorily if the high requirements placed on the purity of the raw materials and establishment of narrow reaction conditions are observed. The main hindrance is the considerable incompatibility of the starting components, as a result of which the rate of reaction is considerably reduced. The expensive precious metal catalysts are a further disadvantage.

Besides this catalytic process, there are barely any synthesis methods with which hydrophobic siloxanes can be readily joined to hydrophilic organic polymers in a smooth reaction. This is most likely possible still with the addition of acetoacetate polyethers or acrylate polyethers onto aminosiloxanes. In both cases, the reaction times are very long on account of the low solubility of the raw materials in one another.

U.S. Pat. No. 6,664,342 B1 describes the addition of neutral maleic diesters onto aminosiloxanes. These maleic diesters are esters with $C_1$-$C_4$-alcohols which dissolve in the siloxane to give a clear solution and are therefore homogeneously dispersed in the siloxane. Nevertheless, reaction times of 1 to 10 hours at 80 to 220° C. are required. Moreover, the required excess of diester has to be distilled off when the reaction is complete. Aspartic ester-functional silicones are obtained; copolymers are not obtained in this way.

Although U.S. Pat. No. 5,990,334 A describes siloxanes which contain acid groups and which are obtained by the addition of acidic organic compounds which contain double bonds onto aminosiloxanes, the C=C double bonds are defined as acrylates which contain the acid group in the carbinol moiety. Such starting materials are complex to prepare and have to be protected against intrinsic polymerization with stabilizers.

EP 324 595 B1 describes the use of monomeric maleic monoesters onto which amino compounds are added. However, the amines are monomeric organic compounds with primary or secondary amine groups which dissolve homogeneously in the monomeric monoesters. The monomeric organic starting materials used in this process are compatible with one another since they contain no silicone constituent. Silicone copolymers can therefore not be obtained in this way.

SUMMARY OF THE INVENTION

It was an object of the invention to provide silicone copolymers which are obtained in a simple process, under mild reaction conditions, in high yields, without using stabilizers and in particular without using catalysts, from silicone polymers and organic polymers, in particular hydrophilic organic polymers such as polyethers. These and other objects are achieved by the invention, which provides for a process in which a polyoxyalkylene polyether is reacted with maleic anhydride and the reaction product is then reacted with an organopolysiloxane bearing a primary or secondary amino group.

DETAILED DESCRIPTION OF THE PREFERRED EMBODIMENTS

The invention thus provides a process for preparing silicone aspartate copolymers by, in a first step, reacting an organic polymer (1) having at least one hydroxyl group with maleic anhydride (2)

(I)

with the proviso that maleic anhydride (2) is used in amounts of 0.5 to 1.1 mol per mole of hydroxyl group (—OH) in the polymer (1),
and, in a second step,
reacting the maleic monoester (3) obtained from the first step with an organopolysiloxane (4) having at least one primary or secondary amino group (—NH—),
with the proviso that the organopolysiloxane (4) is used in amounts of 1 to 10 mol, preferably 1 to 3 mol, of amino group (—NH—) in (4) per mole of C=C double bond in the maleic monoester (3).

As organic polymer (1) having at least one hydroxyl group, preference is given to using polyethers, polyesters or polycarbonates having at least one hydroxyl group.

In the process according to the invention, the organic polymer (1) having at least one hydroxyl group used is preferably a compound of the formula $$\text{Poly}(\text{—OH})_r \quad \text{(II)}$$

where
r is an integer from 1 to 4, preferably 1 or 2, and
Poly is a mono- to tetravalent, preferably mono- or divalent, organic polymer radical which preferably contains at least one ≡C—O—C≡ or —C(=O)—O—C≡ group and is most preferably a polyether radical.

Preferably, the organic polymer (1) is a compound of the formula $$R^1[(-Z)_s-OH]_r \quad \text{(III)}$$

where
Z is a radical of the formula —O—(C=O)$_p$—R$^5$—,
R$^1$ is a mono- to tetravalent, preferably mono- to divalent, hydrocarbon radical having 1 to 30 carbon atoms, preferably 1 to 18 carbon atoms,
R$^5$ is a linear or branched $C_2$-$C_8$-alkylene radical,
p is 0 or 1, preferably 0,
r is 1, 2, 3 or 4, preferably 1 or 2, and
s is an integer from 3 to 100, preferably 8 to 80.

Examples of monovalent hydrocarbon radicals R having 1 to 18 carbon atoms are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radicals; alkaryl radicals such as the o-, m-, and p-tolyl radicals, xylyl radicals and ethylphenyl radicals; and aralkyl radicals such as the benzyl radical, and the α- and the β-phenylethyl radicals.

Examples of monovalent hydrocarbon radicals $R^1$ having 1 to 18 carbon atoms are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radical; alkaryl radicals such as the o-, m-, and p-tolyl radicals, xylyl radicals and ethylphenyl radicals; and aralkyl radicals such as the benzyl radical, and the α- and the β-phenylethyl radicals.

Examples of divalent radicals $R^1$ are radicals of the formula

—CH$_2$CH$_2$—

—CH$_2$CH(CH$_3$)—

—CH$_2$CH$_2$CH$_2$CH$_2$—

—CH$_2$CH$_2$CH$_2$CH$_2$CH$_2$CH$_2$— and examples of tri- and tetravalent radicals $R^1$ are radicals of the formula

—CH$_2$(CH—)CH$_2$—

CH$_3$C(CH$_2$—)$_3$

C$_2$H$_5$C(CH$_2$—)$_3$

C(CH$_2$—)$_4$.

Preferably, Z is a ring-opened epoxide or lactone having 2 to 8, preferably 2 to 6, carbon atoms. Examples of Z are radicals of the formula

—OCH$_2$CH$_2$

—OCH$_2$CH(CH$_3$)—

—OCH(CH$_3$)CH$_2$—

—OCH$_2$CH$_2$CH$_2$CH$_2$—

—OCH$_2$C(CH$_3$)$_2$—

—O(C=O)—CH$_2$CH$_2$CH$_2$—

—O(C=O)—CH$_2$CH$_2$CH$_2$CH$_2$—

—O(C=)—CH$_2$CH$_2$CH$_2$CH$_2$CH$_2$—.

Preference is given to polyether radicals which contain 3 to 100 of these groups Z, more preferably 8 to 80 groups Z.

Preferably, the organic polymers (1) contain at least 3 oxyethylene, oxypropylene or oxybutylene units or mixed forms in blockwise or statistical arrangement.

Preferred organic polymers (1) are therefore polyethers of the formula $$R^6—[O—R^5]_s—O—H \qquad (IV),$$

with particular preference being given to those of the formula $$R^6—[O—CH_2—CH(CH_3)]_x—[O—CH_2—CH_2]_y—O—H \qquad (V),$$

in which

R is a monovalent hydrocarbon radical having 1 to 18 carbon atoms, $R^5$ is a linear or branched $C_2$-$C_8$-alkylene radical, $R^6$ is a hydrogen atom, a radical R or a radical of the formula $R^7$—C(O)—, in which $R^7$ is a $C_1$-$C_{18}$-alkyl radical, x is 0 or an integer from 1 to 100 and y is 0 or an integer from 1 to 100, with the proviso that the sum x+y is at least 3, preferably 8 to 80.

Within the context of this invention, formula (V) is intended to be understood as meaning that x units of —[O—CH$_2$—CH(CH$_3$)]— and y units of —[O—CH$_2$—CH$_2$]— can be distributed in any desired way within the polyether molecule.

Preferably, $R^6$ is a hydrogen atom or a hydrocarbon radical R having 1 to 8 carbon atoms. If $R^6$ is a hydrocarbon radical R, $R^6$ is preferably a $C_1$-$C_8$-alkyl radical.

The organic polymers (1) can have either primary, secondary or tertiary carbinol ends. According to the index "r", they are preferably mono- or difunctional. The organic polymers (1) are prepared by generally known processes.

If monofunctional polymers (1), i.e. those with a hydroxyl group, preferably monofunctional polyethers, are used, maleic anhydride is preferably used in amounts of 0.8 to 1.1 mol per mole of hydroxyl group (—OH) in (1). If difunctional polymers (1), i.e. those with two hydroxyl groups, preferably difunctional polyethers, are used, maleic anhydride is preferably used in amounts of 0.5 to 1.0 mol per mole of hydroxyl group (—OH) in (1).

In the first step of the process according to the invention, when using monofunctional polymers (1), preferably 80 to 100% of the OH groups are esterified, and when using difunctional polymers preferably 40 to 100% of the OH groups are esterified.

The first process step is preferably carried out in the presence of tertiary amines. Examples of tertiary amines are trimethylamine, triethylamine, tripropylamine, tributylamine, dimethylethylamine, dimethylisopropylamine, diethylisopropylamine, dimethylcyclohexylamine, diethylbutylamine, triiso-octylamine and methylmorpholine.

The first step of the process according to the invention is preferably carried out at a temperature of 20 to 140° C., more preferably at 40 to 120° C., and most preferably at 50 to 100° C., and takes place preferably at the pressure of the ambient atmosphere, i.e. at ca. 1020 hPa, but can also be carried out at higher or lower pressures.

In the first step of the process according to the invention, maleic monoesters (3) of hydroxy-functional polymers are obtained.

These maleic monoesters (3) contain groups of the formula $$HO-(O=)C-CH=CH-C(=O)-O-(Poly) \quad (VI),$$

where
(Poly) indicates a linkage to an organic polymer radical of (1).

If, for example, in the first step of the process according to the invention maleic anhydride is reacted with monofunctional polyethers of the formula (V) (where $R^6=R$ in formula (V)), maleic monoesters of the formula $$HO-(O=)C-CH=CH-C(=O)-O-$$
$$[CH_2CH_2O]_y-[CH(CH_3)CH_2O]_x-R \quad (VI'),$$

are obtained, where R, x and y have the meaning given above for them.

These maleic monoesters (3) are reacted in the second step of the process according to the invention with organopolysiloxanes (4) which have at least one primary or secondary amino group.

Preferably, the primary or secondary amino group in the organopolysiloxane (4) is an Si—C bonded group X of the general formula $$-R^2-[NR^3-R^4-]_g NHR^3 \quad (VII),$$

where
$R^2$ is a divalent linear or branched hydrocarbon radical having 1 to 18 carbon atoms,
$R^3$ is a hydrogen atom or a monovalent hydrocarbon radical having 1 to 18 carbon atoms, preferably a $C_1$-$C_4$-alkyl radical, or an acyl radical, preferably a hydrogen atom,
$R^4$ is a divalent hydrocarbon radical having 1 to 6 carbon atoms, and
g is 0, 1, 2, 3 or 4, preferably 0 or 1.

In addition to the primary and secondary amino groups, the organopolysiloxanes (4) can also contain tertiary amino groups or else contain alkoxy or hydroxyl groups, although these do not participate in the linkage reaction of (3) with (4), but in some cases assist a condensation of the primarily formed silicone aspartate copolymers to give larger polymers.

Preferably, the organopolysiloxanes (4) used are those of the general formula $$X_a R_b (R'O)_c SiO_{\frac{4-(a+b+c)}{2}} \quad (VIII)$$

where
X has the meaning given above for it,
R is a monovalent hydrocarbon radical having 1 to 18 carbon atoms,
R' is a hydrogen atom or a monovalent hydrocarbon radical having 1 to 18 carbon atoms, preferably a $C_1$-$C_4$-alkyl radical,
a is 0 or 1,
b is 0, 1, 2 or 3,
c is 0 or 1,
with the proviso that the sum a+b+c is ≤3, and that the organopolysiloxanes contain at least one radical X per molecule.

Preferred organopolysiloxanes (4) used are those of the general formula $$X_k R^*_{3-k} SiO(R_2 SiO)_m (XR^* SiO)_n SiR^*_{3-k} X_k \quad (IX)$$

where
X has the meaning given for it above,
$R^*$ is R or a radical of the formula —OR', where R and R' have the meaning given for them above,
k is 0 or 1, m is 0 or an integer from 1 to 1000,
n is 0 or an integer from 1 to 50,
with the proviso that the organopolysiloxanes contain at least one radical X per molecule.

Preferred examples of radicals X are radicals of the formulae $H_2N(CH_2)_3-$ $H_2N(CH_2)_2NH(CH_2)_3-$ $H_2N(CH_2)_2NH(CH_2)CH(CH_3)CH_2-$ $(cyclohexyl)NH(CH_2)_3-$ $CH_3NH(CH_2)_3-$ $(CH_3)_2N(CH_2)_3-$ $CH_3CH_2NH(CH_2)_3-$ $(CH_3CH_2)_2N(CH_2)_3-$ $CH_3NH(CH_2)_2NH(CH_2)_3-$ $(CH_3)_2N(CH_2)_2NH(CH_2)_3-$ $CH_3CH_2NH(CH_2)_2NH(CH_2)_3-$ $(CH_3CH_2)_2N(CH_2)_2NH(CH_2)_3-$ and partially acetylated forms thereof.

Particularly preferred examples of radicals X are radicals of the formulae $H_2N(CH_2)_3-$ $H_2N(CH_2)_2NH(CH_2)_3-$ $(cyclohexyl)NH(CH_2)_3-$ $(acetyl)-NH(CH_2)_2NH(CH_2)_3-$ $H_2N(CH_2)_2N(acetyl)(CH_2)_3-$ Preferably, the radical $R^*$ has the meaning of R.

The organopolysiloxanes (4) preferably have a viscosity from 50 to 50,000 mPa·s at 25° C., more preferably from 200 to 20,000 mPa·s at 25° C., and preferably have an amine content of 0.02 to 1.0 mEquiv/g, more preferably 0.05 to 0.8 mEquiv/g, which corresponds to an amine number of preferably 0.02 to 1.0, preferably 0.05 to 0.8.

The second step of the process according to the invention is preferably carried out at a temperature of 20° to 100° C., more preferably at 40° to 80° C., and preferably takes place at the pressure of the ambient atmosphere, i.e. at ca. 1020 hPa, but can also be carried out at higher or lower pressures.

The formation of the aspartate groups by addition of the amino groups (—NH—) in (4) and the C=C double bond in (3), the so-called hydroamination, takes place under mild conditions within a few hours in a high yield. This addition reaction bonds hydrophobic siloxane polymer with a more hydrophilic polymer, such as polyether or polyester. Catalysts are not required for this purpose.

Since the viscosity of the silicone aspartate copolymers according to the invention is very high on account of their polar structure, the addition reaction in the second process step is preferably carried out in an organic solvent as a diluent.

Examples of organic solvents are alcohols such as methanol, ethanol, n-propanol, isopropanol, and glycols such as ethylene glycol and diethylene glycol, and glycol ethers such as diethylene glycol monobutyl ether.

Organic solvents are preferably used in amounts of preferably 20 to 200 parts by weight, more preferably 25 to 100 parts by weight, per 100 parts by weight of silicone aspartate copolymer obtained.

The addition reaction can also be carried out in the presence of water. Here, the maleic monoester (3) is dissolved in water and the organopolysiloxane (4) is preferably metered in diluted form in organic solvents. This gives an aqueous emulsion of a silicone aspartate copolymer.

In the process according to the invention, silicone aspartate copolymers with aspartate compound groups between the silicone moiety and the organic polymer moiety are obtained. The invention therefore provides silicone aspartate copolymers which contain, per molecule, at least one aspartate compound group Y selected from the group of the formulae $$(\equiv Si)-R^2-[NR^3-R^4-]_g NR^3-CH(-CO_2H)-CH_2-CO_2-(Poly) \quad (X)$$

$$(\equiv Si)-R^2-[NR^3-R^4-]_g NR^3-CH(-CH_2-CO_2H)-CO_2-(Poly) \quad (X')$$

and mixtures thereof,
where
$R^2$, $R^3$, $R^4$ and g have the meaning given for them above,
($Si\equiv$) indicates a linkage via an Si—C bond to the organopolysiloxane and
(Poly) indicates a linkage to an organic polymer radical.

Preferably, the aspartate compound group is bonded to the organopolysiloxane via a siloxane unit of the formula $-SiR^*_d O_{(3-d)/2}$,
where d is 0, 1 or 2, preferably 1 or 2, and
R* has the meaning given for it above.

Preferably, the organic polymer radical (Poly) to which the aspartate compound group is bonded is a polyether group of the formula $-(O-R^5)_s-$,
preferably of the formula $-[O-CH_2-CH(CH_3)]_x-[O-CH_2-CH_2]_y-$,
where $R^5$, s, x and y have the meaning given for them above.

If, for example, in the second step of the process organopolysiloxanes (4) of the formula (IX) with terminal amino groups X (such as aminoethylaminopropyl groups) are used, i.e. those of the formula $$XR_2SiO(R_2SiO)_m SiR_2X \quad (IX')$$

and reacted with maleic monoesters (3) of mono-functional polyethers, i.e. with maleic monoesters of the formula (VI'), in amounts of 1 mol of —$NH_2$ group in (4) per mole of C═C double bond in (3), copolymers of the formula $$R-[OCH_2CH(CH_3)]_x[OCH_2CH_2]_y-Y-R_2SiO(R_2SiO)_m SiR_2-Y-[CH_2CH_2O]_y[CH(CH_3)CH_2O]_x-R \quad (XI)$$

are obtained, i.e. copolymers of the A-B-A type,
where R, X, Y, m, x and y have the meaning given for them above.

The invention further provides emulsions comprising
(i) silicone aspartate copolymers according to the invention
(ii) optionally emulsifiers and (iii) water.

The preparation of the emulsions according to the invention takes place by mixing, preferably intensive mixing of the components (i), (ii) and (iii).

Technologies for producing emulsions of organo-polysiloxanes are known. For example, the intensive mixing can take place in rotor stator stirring devices, colloid mills or in high-pressure homogenizers.

In the emulsions according to the invention, water is preferably used in amounts of 80 to 400 parts by weight, more preferably 100 to 400 parts by weight, in each case based on 100 parts by weight of silicone aspartate copolymers (i) according to the invention.

Emulsifiers (ii) that can be used are all cationic, anionic and nonionic emulsifiers known hitherto, both individually and also as mixtures of different emulsifiers, with which it is possible to produce aqueous emulsions of organopolysiloxanes.

If emulsifiers are used in the emulsions according to the invention, they are preferably used in amounts of 0 to 40 parts by weight, more preferably 5 to 20 parts by weight, in each case based on 100 parts by weight of silicone aspartate copolymers (i) according to the invention.

The silicone aspartate copolymers according to the invention can be rendered water-soluble or self-emulsifying (so-called self-emulsifying systems) depending on the selected stoichiometry, i.e. they require no further auxiliaries for the emulsification.

The process according to the invention has the advantage that despite the incompatibility of the rather hydrophobic aminosilicone polymer (4) and of the rather hydrophilic hydroxy-functional polymer (1) starting materials, such as polyethers or polyesters, if the hydroxy-functional polymers are used in the form of their maleic monoesters (3), the latter will surprisingly spontaneously react with the aminosilicone polymers (4), with the reaction taking place under mild reaction conditions, without use of a catalyst, such as an expensive precious metal catalyst, and with high yields being attained. In a rapid reaction, the otherwise barely miscible polymer starting materials give rise to copolymers in which these starting materials are bonded via aspartate groups. If neutral maleic esters of polyethers, i.e. diesters, are used, virtually no noticeable reaction can be observed. Furthermore, the process according to the invention has the advantage that stabilizers are also not required in order to stabilize unsaturated starting materials against polymerization.

The silicone aspartate copolymers according to the invention have the advantage that the amino acid group between the siloxane polymer and the organic polymer is biodegradable, as a result of which the surface-active properties of the copolymers disappear again.

Preparation of the Maleic Monoesters:
Maleic Monoester M1:

150 g of a dehydrated monomethyl ether of polyethylene glycol-2000 are melted at 60° C. and mixed with 7.3 g of maleic anhydride and 0.8 g of tributylamine. The mixture is left to fully react for 2 hours at 100° C. and then baked at ca. 1 mbar. A wax-like product is obtained. According to 1H-NMR, 81% of the polyether has converted to the maleic monoester.

Maleic Monoester M2:

150 g of a dehydrated polyether of the general formula $C_4H_9O(EO)_{16}(PO)_{11}H$ (EO=ethyleneoxy group, PO=propyleneoxy group) and an OH number of 37.0 are held at 100° C. for 2 hours with 10.5 g of maleic anhydride and 0.8 g of tributylamine. Traces of maleic anhydride are then removed in vacuo. The brownish product contains 84% of the maleic monoester of the polyether.

Maleic Monoester M3:

A mixture of 150 g of the polyether used for M2 and 150 g of a higher molecular weight polyether of the general formula $C_4H_9O(EO)_{35}(PO)_{24}H$ and an OH number of 16.75 (both dehydrated) are held for 2 hours with 14.1 g of maleic anhydride and 1.6 g of tributylamine. The mixture is then baked in vacuo. This gives a clear, slightly brownish polyether maleic monoester with a C═C concentration of 0.45 mEquiv./g.

Maleic Monoester M4:

456 g of the previously dehydrated EO/PO polyetherdiol with an OH number of 59.6 (obtainable as Pluronic PE 3500 from BASF) are heated at 100° C. for 2 hours with 23.8 g of maleic anhydride and 2.4 g of tributylamine. The mixture is then baked in vacuo. On average, only one OH group of the polyetherdiol is converted. The product contains a C=C concentration of 0.503 mEquiv./g.

Maleic Monoester M5:

Similarly to the preparation of M4, 300 g of a dehydrated EO/PO polyetherdiol with an OH number of 40.4 (obtainable as Pluronic PE 6400 from BASF) are reacted with 10.1 g of maleic anhydride and 1.6 g of tributylamine for 2 hours at 100° C., and the mixture is then baked in vacuo. Here too, on average only one OH group is esterified. The double bond concentration is around 0.33 mEquiv./g.

Preparation of the Silicone Copolymers:

Example 1

Copolymer 1

163.4 g of an aminosiloxane made of aminoethylaminopropylmethylsiloxane and dimethylsiloxane units with a mixture of terminal methoxy and hydroxyl groups, an amine number of 0.291 and a viscosity of 1280 mm$^2$/s (25° C.) are homogenized with 44 g of Dowanol DPM and then, after heating to 60° C., mixed with 12.4 g of maleic monoester M1 (amine/maleate=4/1). The initially whitish cloudy mixture becomes homogeneous with a slight opal appearance within ca. 1 minute. After 2 hours at 60° C., the conversion of the maleic radical with the amino groups is determined by $^1$H-NMR. The signals for the unsaturated protons of the —HC=CH group of the monoester in the range 6-7 ppm have virtually completely disappeared. The conversion is more than 95%. Consequently, ca. 25% of all amine groups are converted to aspartate.

Example 2

Copolymer 2a 150 g of an aminosiloxane made of aminopropyldimethylsiloxane and dimethylsiloxane units with an amine number of 0.191 are diluted with 42.9 g of Dowanol DPM and admixed at 60° C. with 21.6 g of maleic monoester M2 (amine/maleate=2/1). The initially very cloudy mixture becomes clear with a slightly exothermic reaction after ca. 20 minutes, with the reaction mixture becoming considerably more viscous. After a further 100 minutes, the mixture is cooled. This gives a colorless clear 80% strength copolymer solution with a viscosity of 1540 mm$^2$/s (25° C.). The conversion of maleate groups is more than 95%.

Example 3

Copolymer 2b

The preparation method for copolymer 2a is repeated except that 34.2 g of maleic monoester M2 are used, giving an amine/maleate ratio of 1.2/1. The conversion of the maleate groups is here too above 95%, the viscosity of the copolymer solution 8500 mm$^2$/s (25° C.)

Example 4

Copolymers 3a-c 150 g of an aminosiloxane made of aminoethylaminopropyldimethylsiloxane and dimethylsiloxane units with an amine number of 0.395 are reacted in the dilution in Dowanol DPM given in the table with the amounts of maleic monoester M3, likewise given in the table, at 60° C. for 2 hours.

TABLE

| Copolymer | Amount of M3 in g | NH$_2$/C=C ratio | Amount of DPM in g | Solution | Homogeneous | Conversion | Viscosity mPa·s (25° C.) |
|---|---|---|---|---|---|---|---|
| 3a | 32.6 | 2.0 | 45.6 | 80% | after 0.3 h | 93% | 1600 |
| 3b | 43.4 | 1.5 | 48.4 | 80% | immediately | >95% | 4000 |
| 3c | 65.2 | 1.0 | 92.2 | 70% | immediately | >95% | 4100 |

Copolymers with A-B-A structure, where the polyether maleate is added in each case onto the end groups of the aminosiloxane, can be prepared with good conversion with a different degree of derivatization. The higher this is selected to be, the more hydrophilic the copolymer, and the higher the viscosity.

Example 5

Copolymer 4

75 g of an aminosiloxane made of aminopropyldimethylsiloxane and dimethylsiloxane units with an amine number of 0.289 are diluted with 118 g of diethylene glycol monobutyl ether and heated to 60° C. Within 2 minutes, 43.1 g of the maleic monoester M4 are metered in. The initially very cloudy reaction solution is already clear shortly after the metered addition is complete, but is held for a further 2 hours at 60° C. The clear solution comprises ca. 50% by weight of copolymer, which consists to about 60% of siloxane.

Example 6

Emulsion of Copolymer 4

43.1 g of the maleic monoester M4 are diluted with 111 g of water to give a clear solution. To this is metered in, with thorough stirring, a solution of 75 g of the aminosiloxane used in the preparation of copolymer 4 in 82.5 g of n-amyl alcohol. This gives a very viscous emulsion which can be diluted with water without problems.

Example 7

Copolymer 5

120 g of the aminosiloxane of amine number 0.395 used for the preparation of copolymers 3a-c are diluted with 127.6 g of Dowanol DPM and heated to 60° C. 71.5 g of the maleic monoester M3 are then metered in, whereupon the initially cloudy mixture becomes clear after a few minutes. After a further 2 hours at 60° C., according to $^1$H-NMR, a conversion of the maleic groups of ca. 96% is achieved. The solution is 40% strength with respect to copolymer and has a viscosity of 1450 mm²/s (25° C.)

83.3 g of this copolymer solution are initially introduced at 50° C. 166.7 g of water are allowed to run in slowly, giving a very finely divided emulsion with a copolymer content of 20% by weight.

The invention claimed is:

1. A process for preparing silicone aspartate copolymers, comprising:

in a first step, reacting an organic polymer (1) of the formula $$R^6[O—CH_2—CH(CH_3)]_x\text{-}[O—CH_2—CH_2]_y—O—H \quad (V)$$

where

R⁶ is a hydrogen atom, a radical R or a radical of the formula R⁷—C(O)—,

R is a monovalent hydrocarbon radical having 1 to 18 carbon atoms,

R⁷ is a $C_1$-$C_{18}$-alkyl radical, x is 0 or an integer from 1 to 100 and y is 0 or an integer from 1 to 100, with the proviso that the sum x+y is at least 3, having at least one hydroxyl group with maleic anhydride (2)

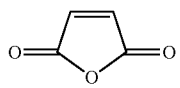

(I)

with the proviso that maleic anhydride is used in amounts of 0.5 to 1.1 mol per mole of hydroxyl group (—OH) in the polymer (1), where a maleic monoester (3) of the formula $$HO—(O=)C—CH=CH—C(=O)—O—[CH_2—CH_2—O]_y—[CH(CH_3)—CH_2—O]_xR^6 \quad (VI)$$

is obtained, and, in a second step, reacting the maleic monoester (3) obtained from the first step with an organopolysiloxane (4) having at least one primary or secondary amino group, where the primary or secondary amino group is an Si—C bonded group X of the formula $$—R^2\text{-}[NR^3\text{-}R^4]_g NHR^3 \quad (VII)$$

where

R² is a divalent linear or branched hydrocarbon radical having 1 to 18 carbon atoms, R³ is a hydrogen atom or a monovalent hydrocarbon radical having 1 to 18 carbon atoms, or an acyl radical, R⁴ is a divalent hydrocarbon radical having 1 to 6 carbon atoms, g is 0, 1, 2, 3 or 4, with the proviso that the organopolysiloxane (4) is used in amounts of 1 to 10 mols, of amino groups in (4) per mole of C=C double bond in the maleic monoester (3), where silicone aspartate copolymers are obtained which contain, per molecule, at least one aspartate group Y of the formulae (X) and (X')

$$(\equiv Si)—R^2—[NR^3—R^4]_g NR^3—CH(—CO_2H)—CH_2—CO_2\text{-}[CH_2—CH_2—O]_y—[CH(CH_3)—CH_2—O]_x— \quad (X)$$

and $$(\equiv Si)—R^2—[NR^3—R^4]_g NR^3—CH(—CH_2—CO_2H)—CO_2\text{-}[CH_2—CH_2—O]_y—[CH(CH_3)—CH_2—O]_x— \quad (X')$$

where (Si≡) indicates a linkage via an Si—C bond to the organopolysiloxane.

2. The process of claim 1, wherein R³ is a $C_{1-4}$ alkyl radical or hydrogen, g is 0 or 1, and the organopolysiloxane (4) is used in amounts of 1 to 10 mols, of amino group in (4) per mole of C=C double bond in the maleic monoester (3).

3. The process of claim 1, wherein in formula (V) the sum x+y is 8 to 80.

4. The process of claim 1, wherein the organopolysiloxane (4) has the formula $$X_a R_b(R'O)_c SiO_{\frac{4-(a+b+c)}{2}} \quad (VIII)$$

where

X is an Si—C bonded radical of the formula $$—R^2—[NR^3\text{-}R^4]_g NHR^3 \quad (VII),$$

R is a monovalent hydrocarbon radical having 1 to 18 carbon atoms,

R' is a hydrogen atom or a monovalent hydrocarbon radical having 1 to 18 carbon atoms, R² is a divalent linear or branched hydrocarbon radical having 1 to 18 carbon atoms, R³ is a hydrogen atom or a monovalent hydrocarbon radical having 1 to 18 carbon atoms, or an acyl radical, R⁴ is a divalent hydrocarbon radical having 1 to 6 carbon atoms, a is 0 or 1, b is 0, 1, 2 or 3, c is 0 or 1, g is 0, 1, 2, 3 or 4, with the proviso that the sum a+b+c is ≤3, and that the organopolysiloxanes (4) contain at least one radical X per molecule.

5. The process of claim 4, wherein R' is a $C_{1-4}$ alkyl radical, and R³ is a $C_{1-4}$ alkyl radical or hydrogen.

6. The process of claim 1, wherein the organopolysiloxane (4) has the formula $$X_k R^*_{3-k} SiO(R_2SiO)_m(XR^*SiO)_n SiR^*_{3-k} X_k \quad (IX)$$

where

R* is R or a radical of the formula —OR',

R' is a hydrogen atom or a monovalent hydrocarbon radical having 1 to 18 carbon atoms, k is 0 or 1, m is 0 or an integer from 1 to 1000, n is 0 or an integer from 1 to 50, with the proviso that the organopolysiloxanes contain at least one radical X per molecule.

7. The process of claim 2, wherein the organopolysiloxane (4) has a formula $$X_k R^*_{3-k} SiO(R_2SiO)_m(XR^*SiO)_n SiR^*_{3-k} X_k \quad (IX)$$

where

R* is R or a radical of the formula —OR',

R' is a hydrogen atom or a monovalent hydrocarbon radical having 1 to 18 carbon atoms, k is 0 or 1, m is 0 or an integer from 1 to 1000, n is 0 or an integer from 1 to 50, with the proviso that the organopolysiloxanes contain at least one radical X per molecule.

8. A silicone aspartate copolymer which contains, per molecule, at least one aspartate group Y of the formulae

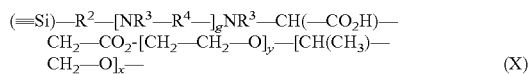  (X)

and

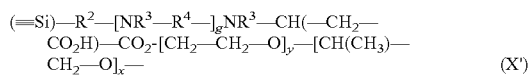  (X')

where $R^2$ is a divalent linear or branched hydrocarbon radical having 1 to 18 carbon atoms, $R^3$ is a hydrogen atom or a monovalent hydrocarbon radical having 1 to 18 carbon atoms, or an acyl radical, $R^4$ is a divalent hydrocarbon radical having 1 to 6 carbon atoms, g is 0, 1, 2, 3 or 4, (Si≡) indicates a linkage via an Si—C bond to the organopolysiloxane.

x is 0 or an integer from 1 to 100 y is 0 or an integer from 1 to 100 with the proviso that the sum of x+y is at least 3.

9. An aqueous emulsion comprising (i) a silicone aspartate copolymer of claim 8, (ii) optionally, one or more emulsifiers, and (iii) water.

10. An aqueous emulsion comprising (i) a silicone aspartate copolymer prepared by the process of claim 1, (ii) optionally, one or more emulsifiers, and (iii) water.

* * * * *